H. FÖTTINGER.
AXIAL THRUST COMPENSATOR FOR TURBINES.
APPLICATION FILED NOV. 11, 1909.

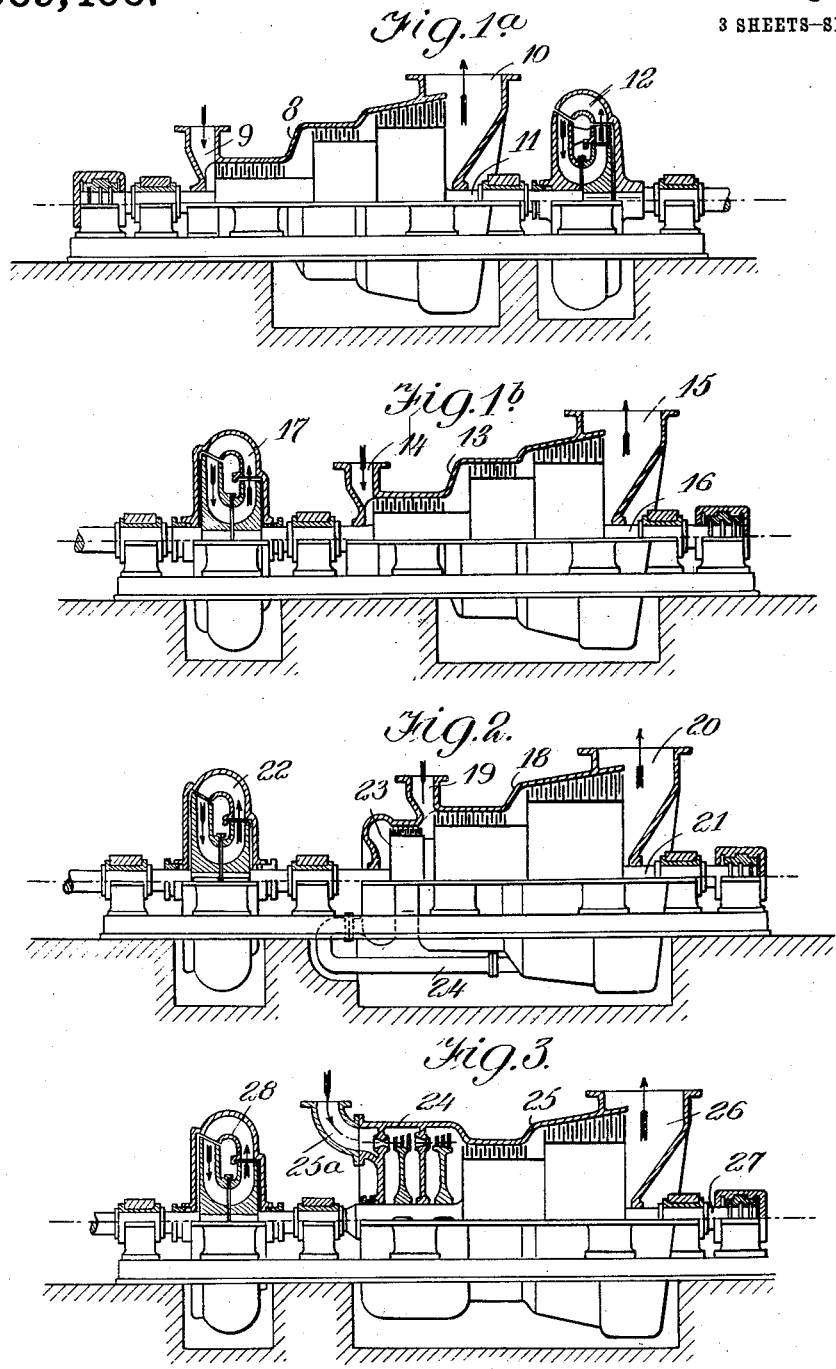

1,069,406.

Patented Aug. 5, 1913.
3 SHEETS—SHEET 2.

WITNESSES
W. C. Baker Jr.
C. E. Holsie

INVENTOR
HERMANN FÖTTINGER
BY
ATTORNEYS

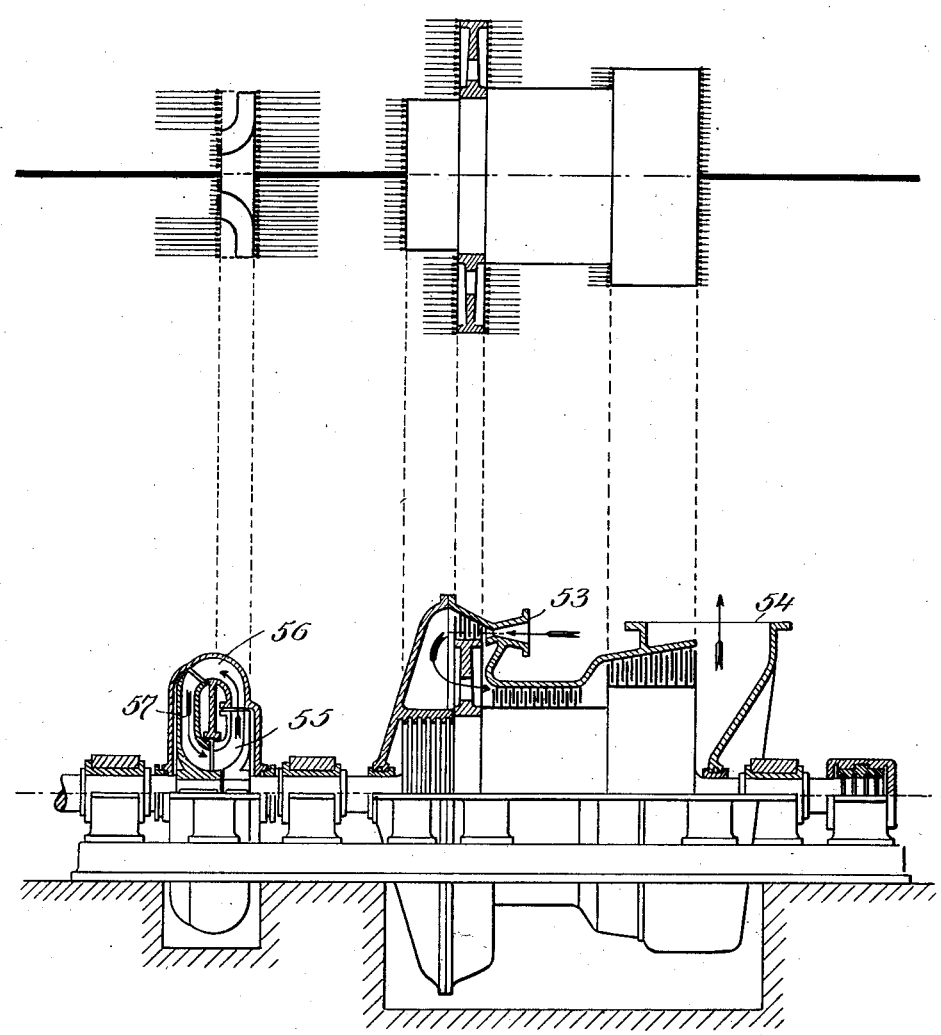

UNITED STATES PATENT OFFICE.

HERMANN FÖTTINGER, OF STETTIN, GERMANY, ASSIGNOR TO STETTINER MASCHINENBAU AKTIEN GESELLSCHAFT "VULCAN," OF STETTIN-BREDOW, GERMANY.

AXIAL-THRUST COMPENSATOR FOR TURBINES.

1,069,406.   Specification of Letters Patent.   Patented Aug. 5, 1913.

Application filed November 11, 1909. Serial No. 527,452.

*To all whom it may concern:*

Be it known that I, HERMANN FÖTTINGER, a subject of the Emperor of Germany, residing at 4 Prutzstrasse, Stettin, Germany, have invented certain new and useful Improvements in Axial-Thrust Compensators for Turbines, of which the following is a specification.

In accordance with the present invention the thrust of the steam or gas upon the rotor of the motor turbine is utilized for compensating wholly or partly for the axial hydraulic thrust of hydraulic transmission gears connected with the motor turbine and vice versa. This arrangement renders it possible to dispense either wholly or in part with the usual pressure compensating means such as pressure plates, labyrinth pistons or thrust bearings, both in the steam turbine and in the hydraulic transmission gear or at least to limit their number considerably. By dispensing with the pressure equalizing means an industrial advantage is obtained because the considerable loss of liquid entailed by the use of labyrinth pistons is avoided and the frictional losses in the thrust bearings are reduced.

The thrust of the steam due to its rapid motion has heretofore been used in the engines of ships for the purpose of resisting or counterbalancing the propeller thrust; the present invention, however, relates to a novel employment in conjunction with hydraulic gears.

In accordance with the invention the steam turbine and the hydraulic transmission gear are arranged relatively to each other in such a manner that their axial pressures are oppositely directed and wholly or partially cancel each other, which is generally not the case with their normal construction and can only be obtained by means of special pressure compensating means in each of the parts.

The special steps by means of which this novel reciprocal compensation is produced are adopted either in the hydraulic gear alone or in the driving turbine alone or in both together. In each case the arrangement must be such that the hydraulic thrust of the gear must oppose the steam thrust in the rotor of the driving turbine and vice versa.

The drawings show diagrammatically by way of example a number of such arrangements. In the description the term "coupling end" is used for that part of the driving turbine located on the drive side in contradistinction to the "free end" of the driving turbine.

Figure 4:
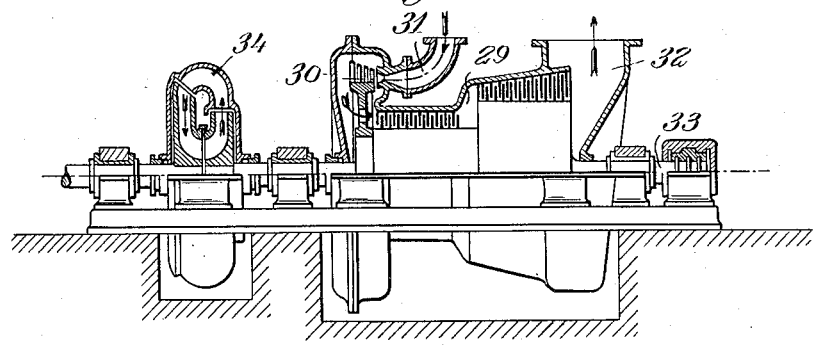
Figure 5:
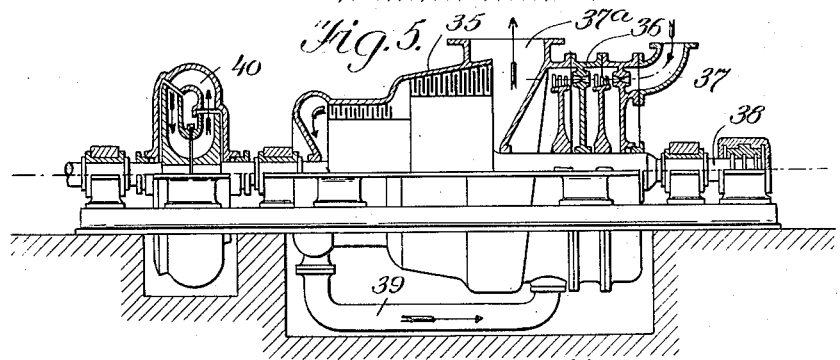
Figure 6:
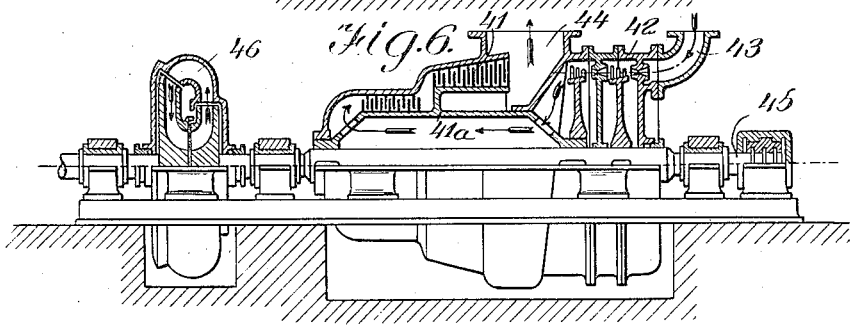
Figure 7:
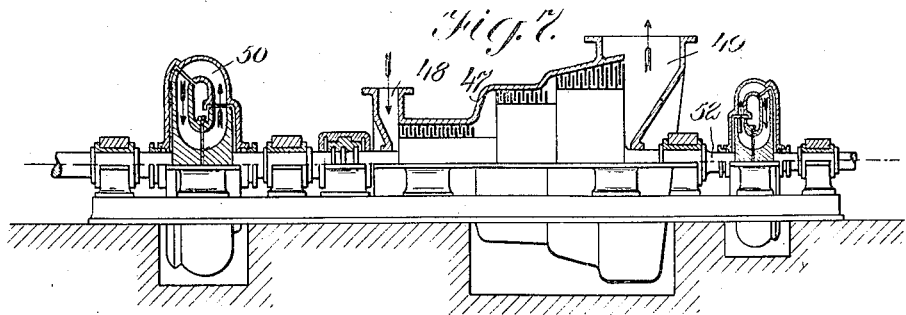

Figure 1ª is a diagram showing the driving turbine as constructed in the ordinary way; Fig. 1ᵇ shows my invention as applied to a simple drum turbine; Fig. 2 is a diagram showing how the invention is used in connection with a low pressure turbine receiving steam from a high pressure turbine or steam engine; Fig. 3 represents another arrangement whereby the invention is used in connection with a high pressure turbine; Fig. 4 shows my invention used in such manner that the steam enters at the middle of the driving turbine; Fig. 5 shows another form in which the steam issues from the middle of the driving turbine; Fig. 6 discloses the use of a hollow shaft in connection with the apparatus; Fig. 7 is a diagram showing how the invention is used in connection with the hydraulic gears on both sides of the steam turbine; Fig. 8 is a diagram showing the distribution of the pressure. Fig. 9 is a side elevation partly broken away and showing more in detail the construction of one form of my improved device.

In Fig. 1ª the driving turbine is constructed in the ordinary way without pressure equalizing means; the admission takes place from the free end and its axial thrust is directed toward the coupling end. In order to compensate for this axial thrust the primary or driving member of the hydraulic transmission gear is constructed in such a manner that it produces an axial thrust directed toward the steam turbine; this is attained owing to the fact that the admission to the primary wheel takes place from the steam turbine side. The shaft between the gear and the steam turbine is therefore under pressure. In the other figures, 1ᵇ to 6, arrangements are shown in which the steam turbine is constructed in a special way by altering the direction of flow of the steam in such a manner that the steam thrust is directed away from the hydraulic gear and the hydraulic thrust away from the steam turbine. The shaft between the gear and the turbine is therefore under tension.

Fig. 1<sup>b</sup> represents the arrangement with a simple drum turbine. The steam enters the driving turbine at the coupling end and flows through it in one direction only toward the free end. The turbine is shown at 8 and is provided with an inlet 9 and an outlet 10. The shaft is shown at 11 and the hydraulic transmission gear at 12. As already stated, in some cases the dimensions of the driving turbine and the hydraulic gear may be selected in such a manner that the thrust of the turbine rotor, under the action of the steam, is equal to the back thrust of the hydraulic transmission gearing.

Fig. 1<sup>b</sup> shows the invention as applied to a turbine as in Fig. 1<sup>a</sup>, but with the difference that the hydraulic transmission gear is placed upon the opposite side of the turbine.

Fig. 2 represents an arrangement with steam pressure compensating piston for thrusts which are not exactly balanced. The turbine is shown at 18 and is provided with an inlet 19 and an outlet 20. The shaft appears at 21 and the hydraulic transmission gearing at 22. At 23 is the steam pressure compensating piston for equalizing thrusts which are not otherwise exactly balanced. Connecting this piston with the turbine 18 is a pipe 18<sup>a</sup>. Fig. 2 also shows an example of a low pressure turbine receiving steam from any high pressure turbine or steam engine. The waste steam of the pressure equalizing piston can be utilized in the turbine for furnishing additional further work as usual.

Fig. 3 represents an arrangement in which a high pressure turbine is connected in front of the low pressure drum of a driving turbine this high pressure turbine being shown by way of example in the figure as a single or multiple pressure and speed stage turbine. The steam enters at the coupling end and flows through the whole turbine only in one direction toward the free end. The turbine 25 is provided with a high pressure drum 24 having an inlet 25<sup>a</sup>. The turbine is further provided with an outlet 26 and a shaft 27. The hydraulic transmission gear is shown at 28.

In order to reduce the length of the construction the arrangement in accordance with Fig. 4 is such that the steam enters at the middle of the driving turbine and flows through the high pressure turbine toward the coupling end and through the low pressure turbine which is formed as a drum in the opposite direction toward the free end. The turbine appears at 29 and is provided with a high pressure unit 30 having an inlet 31. The turbine outlet is shown at 32 and the shaft at 33. The hydraulic transmission gear appears at 34. The conduction of the steam from the high pressure turbine to the low pressure turbine can be effected through the openings in the wheel disk or around it or by means similar to those shown in Figs. 5 and 6.

Fig. 5 represents an arrangement in which the steam issues at the middle of the driving turbine. The steam enters the high pressure turbine at the free end, flows through the turbine first toward the coupling end, is then conducted outside the turbine cylinder into the low pressure turbine and flows through this turbine in the opposite direction toward the free end of the turbine. The turbine 35 is provided with a high pressure unit 36, the latter having an inlet 37. The outlet of the turbine appears at 37<sup>a</sup>. The high pressure unit 36 is connected to other parts of the turbine by a pipe 39. At 40 is the hydraulic transmission gearing.

Fig. 6 shows how the steam may be conducted to the low pressure turbine through a hollow shaft. At 41 is the turbine which contains a hollow shaft 41<sup>a</sup>. The turbine is provided with a high pressure unit 42 having an inlet 43. The turbine outlet is shown at 44 and a solid shaft at 45, this solid shaft being connected rigidly with the hollow shaft 41<sup>a</sup>. The hydraulic transmission gearing appears at 46.

Fig. 7 shows an arrangement in which hydraulic gears are arranged on both sides of the steam turbine. The turbine and the two gears are of such a size that the thrusts of the three separate units taken as a whole as nearly as possible balance each other. The turbine 47 is provided with an inlet 48 and an outlet 49.

At 50 is the hydraulic transmission gearing.

In order to more clearly bring out the action of the various end thrusts occurring in the turbine and in the transmitter, I have shown these parts diagrammatically in Fig. 8. It will be noted that in the transmitter there is an end thrust in one direction equal to the entire cross-sectional area of the transmitter and the reaction on the casing covers the same area but is less at the center than at the peripheral portion. In the turbine there is an end thrust and a reaction, the resultant of which is a tendency for the rotor to move toward the left.

In Fig. 9, I have shown more in detail, one embodiment of the same invention illustrated more diagrammatically in the other figures. The arrangement of parts is similar to that shown in Fig. 4, except that there is an auxiliary pressure - equalizing means employed similar to that shown in Fig. 2. In this construction, the steam enters through an inlet 53 and passes in the direction of the arrow to the outlet 54. The hydraulic power transmitter includes a centrifugal pump or liquid-driving member 55, a stationary guiding casing 56 and a driven member 57. The details of construction of this transmitter will be readily understood from an inspection of my prior application previously referred to. The action of the centrifugal pump 55 tends to pull the same toward the left from the position shown and tends to counteract the opposite pull of the turbine.

The method of employing the pressure equalization described above is applicable to all kinds of hydraulic gears or hydraulic couplings in combination with all kinds of steam turbines including cases where any additional relieving surfaces are provided at any place. Auxiliary thrust bearings or pressure equalizing pistons can be provided according to requirements for increasing the effect but they serve only a subsidiary purpose. The auxiliary thrust bearings can be arranged at any desired part of the driving shaft that is to say at the free end or at the coupling end for example. A number of steam turbines on a driving shaft can be used for driving a transformer.

The invention can be advantageously applied to gas turbines of all kinds.

What I claim and desire to secure by Letters Patent of the United States is:—

1. In a power transmission system, the combination of a turbine, a shaft connected therewith, a hydraulic transmission gear connected with said shaft and spaced apart from said turbine, and mechanism for equalizing the fluid thrust directed against said turbine and said hydraulic transmission gear.

2. In a power transmission system, the combination of a turbine, a hydraulic transmission gear, a shaft connected with said turbine and with said hydraulic transmission gear, and means for directing the flow of a liquid in a direction contrary to that of the thrust exerted by said liquid against said turbine or against said hydraulic transmission gear.

3. In a power transmission system, a rotating driving turbine exerting an axial thrust while in operation, a hydraulic transmission gear exerting an axial thrust while in operation, means for transmitting the rotation of said turbine to said hydraulic transmission gear, and mechanism for causing the axial thrust of said turbine to counter-balance the axial thrust of said transmission gear.

4. In a power transmission system, a rotating driving turbine exerting an axial thrust while in operation, a hydraulic transmission gear exerting an axial thrust while in operation, means for transmitting the rotary motion from said turbine to said transmission gear, means for directing the axial thrust of said turbine against the axial thrust of said transmission gear so that one of said axial thrusts partially counter-balance the other, and means co-acting with the weaker of said thrusts for completely counter-balancing the stronger of said thrusts.

5. In a power transmission system a rotating driving turbine exerting an axial thrust in operation, a hydraulic transmission gear exerting an axial thrust in operation, a shaft for transmitting the rotation of said turbine to said hydraulic transmission gear, and means for directing one of said thrusts against the other.

6. In a power transmission system, a revoluble driving member subjected while in operation to an axial thrust, a hydraulic transmission gear likewise subjected, while in action, to an axial thrust, a shaft for transmitting power from said driving member to said transmission gear, means whereby one of said axial thrusts partially neutralizes the other, and additional mechanism for completely equalizing the two axial thrusts.

7. In a power transmission system, the combination of a turbine provided with a shaft, said shaft, while in action, being subjected to a thrust, and hydraulic transmission gears mounted upon said shaft and subjected, while in action, to a thrust contrary to the thrust first mentioned, the two thrusts being directed one against the other.

8. In a power transmission system, the combination of a turbine provided with a driving shaft subjected to an axial thrust, a hydraulic transmission gear including a revoluble member, said revoluble member being subjected to an axial thrust opposing said first-mentioned axial thrust and being mounted upon said driving shaft, means for admitting a propelling fluid into said turbine at its end nearest the hydraulic transmission gear, and means for admitting a propelling fluid into said revoluble member of said transmission gear at a point remote from said turbine.

9. In a power transmission system, the combination of a turbine provided with a driving shaft which is subjected, while said turbine is in action, to an axial thrust, a hydraulic transmission gear including a revoluble member, said revoluble member being mounted upon said shaft and subjected to an axial thrust contrary to said first-mentioned axial thrust, said turbine receiving its propelling fluid at the end thereof nearest the hydraulic transmission gear, and said hydraulic transmission gear receiving its fluid at the end thereof remote from said turbine, and auxiliary mechanism connected with said turbine to counterbalance a portion of the axial thrust thereof.

10. In a power transmission system, a turbine exerting an axial thrust, a driving shaft therefor, a hydraulic transmission gear including a driving member, said driving member exerting an axial thrust and being mounted on said driving shaft, means for admitting a propelling fluid into said turbine at its end nearest the hydraulic transmission gear, means whereby the fluid in the hydraulic transmission gear enters said driving member at its end remotest to said turbine, and auxiliary means to counterbalance part of the axial thrust of its driving member.

11. In a power transmission system, a two-stage turbine comprising high and low pressure stages and exerting an axial thrust, a hydraulic transmission gear including a driving member, said driving member exerting an axial thrust and mounted on said driving shaft, means for introducing a propelling fluid into said high pressure turbine in a direction toward the hydraulic transmission gear, means for introducing said propelling fluid into said low pressure stage in a direction away from said hydraulic transmission gear, and means whereby the fluid in the hydraulic transmission gear enters said driving member at its end remotest to said turbine.

12. In a power transmission system, a two-stage turbine comprising high and low pressure stages and exerting an axial thrust, a hydraulic transmission gear including a driving member, said driving member exerting an axial thrust and mounted on said driving shaft, means for introducing a propelling fluid into said high pressure turbine in a direction toward the hydraulic transmission gear, means for introducing said propelling fluid into said low pressure stage in a direction away from said hydraulic transmission gear, means whereby the fluid in the hydraulic transmission gear enters said driving member at its end remotest to said turbine, and auxiliary means connected with said turbine to counterbalance part of its axial thrust.

In testimony whereof I affix my signature in presence of two witnesses.

HERMANN FÖTTINGER.

Witnesses:
 HEINRICH NEUMANN,
 FREDERIC WARHTY.